Patented May 26, 1936

2,042,047

UNITED STATES PATENT OFFICE 2,042,047

ACCELERATORS OF VULCANIZATION

Albert F. Hardman, Cumberland, Md., assignor, by mesne assignments, to The Kelly-Springfield Tire Company, Cumberland, Md., a corporation of Maryland No Drawing. Application June 26, 1933, Serial No. 677,679

14 Claims. (Cl. 18—53)

The present invention relates to the art of rubber manufacture and particularly relates to a new class of rubber vulcanization accelerators for use in the vulcanization of rubber and rubber-like products.

The new and preferred class of accelerators may be represented by the structural formula

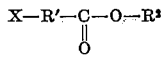

wherein X represents one or more dithio acid residues of the formula

R representing an organic radical, R' represents an aliphatic radical and R² represents an ester forming radical. The compounds according to the present invention are obtainable by reacting a salt of a dithio acid with an ester of a halogen substituted aliphatic acid.

As examples of the new and preferred class of accelerators and included within the scope of the present invention are the following: benzyl dithiofuroicacetate, cyclohexyl dithiofuroicacetate, phenyl dithiofuroicacetate; beta naphthyl dithiofuroicacetate, methyl dithiofuroicacetate; ethyl dithiofuroicacetate, butyl dithiofuroicacetate, amyl dithiofuroicacetate, capryl dithiofuroicacetate, normal propyl dithiofuroicacetate, isopropyl dithiofuroicacetate, ethyl dithiofuroicpropionate, methyl dithiofuroicformate, butyl dithiofuroicbutyrate, ethyl di [dithiofuroic] acetate (reaction product of substantially two molecular proportions of ammonium dithiofuroate and substantially one molecular proportion of ethyl dichloracetate), reaction product of substantially one molecular proportion of an alkali metal salt, for example, the potassium salt of diethyl-dithiocarbamate and substantially one molecular proportion of ethyl chloracetate, reaction product of substantially one molecular proportion of an alkali metal salt, for example, the potassium salt of ethyl xanthic acid and substantially one molecular proportion of butyl chloracetate, reaction product of substantially one molecular proportion of sodium butyl xanthate and substantially one molecular proportion of ethyl chlorformate and the reaction product of substantially two molecular proportions of potassium amyl xanthate and substantially one molecular proportion of amyl dichlorpropionate. The examples hereinbefore set forth are typical members of the new and preferred class of rubber vulcanization accelerators.

The following are to be understood as illustrative embodiments of the invention and not limitative of the scope thereof.

Example I 200 grams of ammonium dithiofuroate, containing about 10-20% of water insoluble impurities, were dissolved in 600 cc. of warm water and filtered. The filtrate thus obtained was placed in a suitable reactor equipped with an agitator and 135 g. of ethyl chloracetate added. The reacting components were agitated vigorously for substantially five hours at a temperature of substantially 40–50° C., during which time cooling was effected by surrounding the reaction vessel with cold water. After the reaction was completed, the reaction product was poured into an equal volume of cold water, and the oil separated therefrom. The separated oil was washed with water and dried over a suitable drying agent, for example anhydrous calcium chloride. A yield of 241 g. of a clear red liquid was obtained, which, after recrystallization once from ethyl alcohol had a melting point of 25° C. It is believed the reaction described above may be represented as follows:

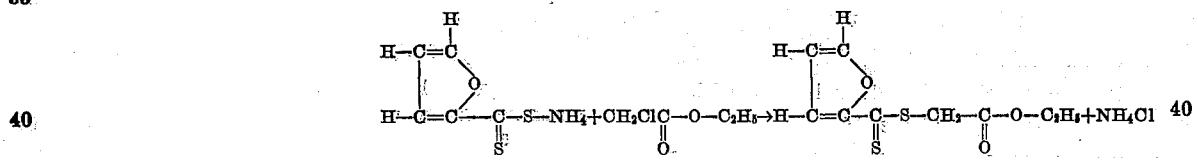

The ethyl dithiofuroicacetate prepared as described was incorporated in the usual manner in a rubber stock comprising

| | Parts |
|---|---|
| Smoked sheet rubber | 100 |
| Sulfur | 3 |
| Zinc oxide | 5 |
| Stearic acid | 2 |
| Accelerator | 0.85 |

After vulcanizing by heating for different periods of time at the temperature of 20 pounds of steam pressure per square inch (258° F.), the following tensile and modulus data were obtained.

Table I

| Cure mins. | Modulus of elasticity in lbs./in.² at elongation of 500 percent | Tensile at break in lbs./in.² |
|---|---|---|
| 10 | Blown | |
| 15 | 450 | 3740 |
| 20 | 720 | 4440 |

From the data set forth in Table I it is readily apparent that the preferred class of materials, for example ethyl dithiofuroicacetate, exhibits desirable qualities as vulcanization accelerators.

Furthermore, the new class of accelerators has been found to possess the desired delayed action; e. g., no cure is produced during the milling of the rubber stock.

Among other examples of the new class of accelerators which have been prepared in a manner analogous to that described above are:

|  | Melting point |
|---|---|
| Benzyl dithiofuroicacetate | 55° C. |
| Cyclohexyl dithiofuroicacetate | 58° C. |
| Phenyl dithiofuroicacetate | 105° C. |
| Beta naphthyl dithiofuroicacetate | 71° C. |
| Methyl dithiofuroicacetate | 16° C. |
| Butyl dithiofuroicacetate | 9° C. |
| Amyl dithiofuroicacetate | |
| Capryl dithiofuroicacetate | 17° C. |
| Normal propyl dithiofuroicacetate | 43° C. |
| Iso-propyl dithiofuroicacetate | |

The melting points given above for the first four compounds were obtained on once recrystallized materials. The melting points set forth for the remainder of the compounds were those obtained on the unpurified product. Further purification would probably cause slight differences in this physical property.

The products hereinafter described were compounded in the usual manner in a rubber stock comprising

|  | Parts |
|---|---|
| Smoked sheet rubber | 100 |
| Sulfur | 3 |
| Zinc oxide | 5 |
| Stearic acid | 2 |

To the base rubber stock there were added the accelerators in the quantities set forth. After vulcanizing by heating in a press for the periods indicated, at the temperature of 20 pounds of steam pressure per square inch (258° F.), the cured rubber product possessed the tensile and modulus characteristics given in Table II.

Table II

| Accelerator | Quantity of accelerator parts | Cure mins. | Modulus of elasticity in lbs./in.² at elongation of 500 percent | Tensile at break in lbs./in.² |
|---|---|---|---|---|
| Benzyl dithiofuroicacetate | 1.075 | 10 | Blown | |
| Cyclohexyl dithiofuroicacetate | 1.045 | 10 | Blown | |
| Phenyl dithiofuroicacetate | 1.025 | 10 | Blown | |
| Beta naphthyl dithiofuroicacetate | 1.21 | 10 | Blown | |
| Methyl dithiofuroicacetate | 0.795 | 10 | Blown | |
| Butyl dithiofuroicacetate | 0.95 | 10 | Blown | |
| Amyl dithiofuroicacetate | 1.00 | 10 | Blown | |
| Capryl dithiofuroicacetate | 1.25 | 10 | Blown | |
| Benzyl dithiofuroicacetate | 1.075 | 15 | 450 | 3060 |
| Cyclohexyl dithiofuroicacetate | 1.045 | 15 | 550 | 3980 |
| Phenyl dithiofuroicacetate | 1.025 | 15 | 450 | 3300 |
| Beta naphthyl dithiofuroicacetate | 1.21 | 15 | 550 | 3660 |
| Methyl dithiofuroicacetate | 0.795 | 15 | 470 | 2810 |
| Butyl dithiofuroicacetate | 0.95 | 15 | 420 | 2710 |
| Amyl dithiofuroicacetate | 1.00 | 15 | 530 | 3340 |
| Capryl dithiofuroicacetate | 1.25 | 15 | 380 | 2540 |
| Benzyl dithiofuroicacetate | 1.075 | 20 | 580 | 3700 |
| Cyclohexyl dithiofuroicacetate | 1.045 | 20 | 750 | 4100 |
| Phenyl dithiofuroicacetate | 1.025 | 20 | 670 | 3840 |
| Beta naphthyl dithiofuroicacetate | 1.21 | 20 | 700 | 3940 |
| Methyl dithiofuroicacetate | 0.795 | 20 | 710 | 4060 |
| Butyl dithiofuroicacetate | 0.95 | 20 | 700 | 4350 |
| Amyl dithiofuroicacetate | 1.00 | 20 | 710 | 4320 |
| Capryl dithiofuroicacetate | 1.25 | 20 | | |
| Benzyl dithiofuroicacetate | 1.075 | 30 | 690 | 4020 |
| Cyclohexyl dithiofuroicacetate | 1.045 | 30 | 800 | 4200 |
| Phenyl dithiofuroicacetate | 1.025 | 30 | 750 | 4200 |
| Beta naphthyl dithiofuroicacetate | 1.21 | 30 | 740 | 3700 |
| Methyl dithiofuroicacetate | 0.795 | 30 | 800 | 3980 |
| Butyl dithiofuroicacetate | 0.95 | 30 | 800 | 4210 |
| Amyl dithiofuroicacetate | 1.00 | 30 | 770 | 4370 |
| Capryl dithiofuroicacetate | 1.25 | 30 | 750 | 4080 |

From the data set forth in Table II it has been shown that the compounds described when incorporated in a rubber stock are all strong vulcanization accelerators. Further all have been found to possess delayed action.

Normal propyl dithiofuroicacetate and iso-propyl dithiofuroicacetate have also been incorporated in rubber stocks and have been found to possess the accelerating properties typical of the class.

By the term alkali metal as set forth in the claims attached hereto as a part of the present specification is meant the alkali metals, lithium, potassium, sodium, caesium and rubidium, together with the NH₄ group.

The present invention is not limited to the specific examples given above, as they are to be construed as specific embodiments of the present invention and not as limitations of the scope thereof. Likewise the quantities of materials employed and the procedure of preparation may be widely varied without departing from the scope of this invention, nor is it intended to limit the use of any member of the new class of accelerators to any particular rubber composition. The present invention is limited solely by the claims attached hereto as a part of this specification.

What is claimed is:

1. A rubber vulcanization accelerator of the general structure

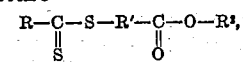

where R represents a furyl radical, R' represents an alkylene group and $R^2$ represents a hydrocarbon ester forming radical.

2. A rubber vulcanization accelerator of the general structure $$R-\underset{\underset{S}{\|}}{C}-S-R'-\underset{\underset{O}{\|}}{C}-O-R^2,$$

wherein R represents the furyl radical, R' represents the methylene group and $R^2$ represents an alkyl radical.

3. A rubber vulcanization accelerator comprising ethyl dithiofuroicacetate.

4. A rubber vulcanization accelerator comprising phenyl dithiofuroicacetate.

5. A rubber vulcanization accelerator comprising cyclohexyl dithiofuroicacetate.

6. The vulcanized rubber product produced by heating rubber and sulfur in the presence of a rubber vulcanization accelerator of the general structure $$R-\underset{\underset{S}{\|}}{C}-S-R'-\underset{\underset{O}{\|}}{C}-O-R^2,$$

where R represents a furyl radical, R' represents an alkylene group and $R^2$ represents a hydrocarbon ester forming radical.

7. The vulcanized rubber product produced by heating rubber and sulfur in the presence of a rubber vulcanization accelerator of the general structure $$R-\underset{\underset{S}{\|}}{C}-S-R'-\underset{\underset{O}{\|}}{C}-O-R^2,$$

wherein R represents the furyl radical, R' represents the methylene group and $R^2$ represents an alkyl radical.

8. The vulcanized rubber product produced by heating rubber and sulfur in the presence of a rubber vulcanization accelerator comprising ethyl dithiofuroicacetate.

9. The vulcanized rubber product produced by heating rubber and sulfur in the presence of a rubber vulcanization accelerator comprising phenyl dithiofuroicacetate.

10. The vulcanized rubber product produced by heating rubber and sulfur in the presence of a rubber vulcanization accelerator comprising cyclohexyl dithiofuroicacetate.

11. A rubber vulcanization accelerator of the general structure $$(R\underset{\underset{S}{\|}}{C}S)_n R'\underset{\underset{O}{\|}}{C}O R^2,$$

where R represents a furyl radical, R' represents an aliphatic hydrocarbon radical, $R^2$ represents a hydrocarbon ester forming radical and $n$ represents a whole number less than three.

12. A rubber vulcanization accelerator of the general structure $$XR'\underset{\underset{O}{\|}}{C}OR^2,$$

where X is a dithiofuroic acid residue, R' represents as aliphatic hydrocarbon radical, $R^2$ represents a hydrocarbon ester forming radical.

13. The vulcanized rubber product produced by heating rubber and sulfur in the presence of a vulcanization accelerator of the general structure $$(R\underset{\underset{O}{\|}}{C}S)_n R'\underset{\underset{O}{\|}}{C}OR^2$$

wherein R represents a furyl radical, R' represents an aliphatic hydrocarbon radical, $R^2$ represents a hydrocarbon ester forming radical and $n$ represents a whole number less than three.

14. The vulcanized rubber product produced by heating rubber and sulfur in the presence of a vulcanization accelerator of the general structure $$XR'\underset{\underset{O}{\|}}{C}OR^2,$$

where X is a dithiofuroic acid residue, R' represents an aliphatic hydrocarbon radical, $R^2$ represents a hydrocarbon ester forming radical.

ALBERT F. HARDMAN.